US009008007B2

(12) United States Patent
Pan et al.

(10) Patent No.: US 9,008,007 B2
(45) Date of Patent: Apr. 14, 2015

(54) METHOD FOR SIGNALING MU-MIMO PARAMETERS

(75) Inventors: Kyle Jung-Lin Pan, Smithtown, NY (US); Guodong Zhang, Syosset, NY (US); Donald M. Grieco, Manhasset, NY (US); Philip J. Pietraski, Huntington Station, NY (US)

(73) Assignee: Interdigital Patent Holdings, Inc, Wilmington, DE (US)

( * ) Notice: Subject to any disclaimer, the term of this patent is extended or adjusted under 35 U.S.C. 154(b) by 1411 days.

(21) Appl. No.: 12/563,398

(22) Filed: Sep. 21, 2009

(65) Prior Publication Data

US 2010/0074207 A1 Mar. 25, 2010

Related U.S. Application Data

(60) Provisional application No. 61/099,278, filed on Sep. 23, 2008, provisional application No. 61/221,828, filed on Jun. 30, 2009.

(51) Int. Cl.
*H04W 4/00* (2009.01)
*H04B 7/04* (2006.01)
*H04B 7/06* (2006.01)

(52) U.S. Cl.
CPC ............ *H04B 7/0452* (2013.01); *H04B 7/0665* (2013.01)

(58) Field of Classification Search
None
See application file for complete search history.

(56) References Cited

U.S. PATENT DOCUMENTS

2009/0318183 A1* 12/2009 Hugl et al. ............... 455/522
2010/0054358 A1* 3/2010 Ko et al. ................... 375/267

OTHER PUBLICATIONS

Third Generation Partnership Project, "3rd Generation Partnership Project; Technical Specification Group Radio Access Network; Evolved Universal Terrestrial Radio Access (E-UTRA); Multiplexing and channel coding (Release 8)," 3GPP TS 36.212 V8.6.0 (Mar. 2009).
Third Generation Partnership Project, "3rd Generation Partnership Project; Technical Specification Group Radio Access Network; Evolved Universal Terrestrial Radio Access (E-UTRA); Multiplexing and channel coding (Release 8),"3GPP TS 36.212 V8.3.0 (May 2008).
Third Generation Partnership Project, "3rd Generation Partnership Project; Technical Specification Group Radio Access Network; Evolved Universal Terrestial Radio Access (E-UTRA); Multiplexing and channel coding (Release 8)," 3GPP TS 36.212 V8.7.0 (May 2009).
Nokia et al., "Finalizing Multi-User MIMO for LTE Rel. 8," 3GPP TSG RAN WG1 Meeting #53 bis, R1-082606 (Jun. 30-Jul. 4, 2008).
Ericsson, "Remaining Details on Control Signaling for the MU-MIMO Transmission Mode," 3GPP TSG-RAN WG1 #53bis, R1-082464 (Jun. 30-Jul. 4, 2008).
Interdigital Communications, LLC, "Downlink Control Signaling for MU-MIMO," 3GPP TSG RAN WG1 Meeting #52bis, R1-081386 (Mar. 31-Apr. 4, 2008).
Panasonic, "PDCCH contents and formats," 3GPP TSG-RAN WG1 Meeting #53, R1-082079 (May 5-9, 2008).
NEC Group, "Views on remaining details on MU-MIMO for LTE Rel. 8," TSG-RAN WG1 #54, R1-083006 (Aug. 18-22, 2008).

* cited by examiner

*Primary Examiner* — Jackie Zuniga Abad
(74) *Attorney, Agent, or Firm* — Condo Roccia Koptiw LLP

(57) ABSTRACT

Methods for signaling multi-user multiple-input multiple output (MU-MIMO) parameters for Evolved-UTRA (E-UTRA) are disclosed. Example signaling format methods are presented that allow use of distributed virtual resource blocks (DVRB) or support of four wireless transmit/receive units (WTRUs) but maintaining a predetermined signal format size. A signaling format is also presented that signals transmission precoding matrix indexes used by all co-scheduled WTRUs.

16 Claims, 2 Drawing Sheets

METHOD FOR SIGNALING MU-MIMO PARAMETERS

CROSS REFERENCE TO RELATED APPLICATIONS

This application claims the benefit of U.S. provisional application Nos. 61/099,278 filed on Sep. 23, 2008 and 61/221,828 filed Jun. 30, 2009, which are incorporated by reference as if fully set forth.

FIELD OF INVENTION

This application is related to wireless communications.

BACKGROUND

In 3GPP Long Term Evolution (LTE) systems, multi-user multiple-input multiple output (MU-MIMO) data transmissions can be used to send data from an evolved Node B (eNB) to more than one wireless transmit/receive unit (WTRU) over the same set of time/frequency resources. In order for a WTRU to properly receive this data, it must configure itself according to a set of transmission parameters which are sent by the eNB using a pre-defined downlink control format. The downlink control information (DCI) format to be used by the eNB to signal these parameters is undecided.

Current signaling for MU-MIMO parameters consist of signaling parameters using DCI format 1D. MU-MIMO DCI format 1D is based on DCI format 1B, which is used for single codeword rank 1 precoding SU-MIMO, with potential modification/reinterpretation of specific bits. In one method for signaling transmit power sharing information that maintains the DCI format 1B signal format size, transmit power sharing is indicated using one bit. In the 2 transmitting antennas (2Tx) and 4 transmitting antennas (4Tx) cases, the distributed virtual resource block (DVRB) flag of DCI format 1B is reused to implement a two level power offset. In this scheme, a power offset value of 0 represents a −3 dB decrease with respect to the single user transmission (Tx) power offset signaled by higher layers and a power offset value of 1 represents the same level as the single user transmitting antenna power offset signaled by higher layers. All other fields are the same as in DCI format 1B. The reuse of the DVRB flag removes the option of using DVRBs in order to signal the power sharing ratio.

Alternatives to the above methods have been proposed. A first option reintroduced the DVRB flag and therefore the option of having DVRBs. This kept the two level power offset and maintained a signal format size equal to DCI format 1B for both 2Tx and 4Tx transmissions. A second option didn't reintroduce the DVRB flag and used a four level power offset for the 4Tx case. This second option led to a smaller signal format size than DCI format 1B for the 2Tx case and the same size for the 4Tx case. A third option reintroduced the DVRB flag and used a four level power offset for the 4Tx case. This option maintained a signal format size equal to DCI format 1B for the 2Tx case and a larger signal format size than DCI format 1B for the 4Tx case.

These options have issues including limiting power sharing to two WTRUs, and signal format size not equal to DCI format 1B. The argument for having the same size for DCI formats 1B and 1D is that only one performance test needs to be done rather than two. Therefore methods are needed for signaling parameters to a WTRU that support proper reception of MU-MIMO data transmissions from the eNB including support for four co-scheduled WTRUs for eNBs having four transmit antennas and maintaining a predetermined signal format size.

SUMMARY

Methods for signaling multi-user multiple-input multiple output (MU-MIMO) parameters for Evolved-UTRA (E-UTRA) are disclosed. Example signaling format methods are presented that allow use of distributed virtual resource blocks (DVRB) or support of four wireless transmit/receive units (WTRUs) but maintaining a predetermined signal format size. A signaling format is also presented that signals transmission precoding matrix indexes used by all co-scheduled WTRUs.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a BS, an evolved Node B (eNB), a site controller, an access point (AP), or any other type of interfacing device capable of operating in a wireless environment.

Figure 1:
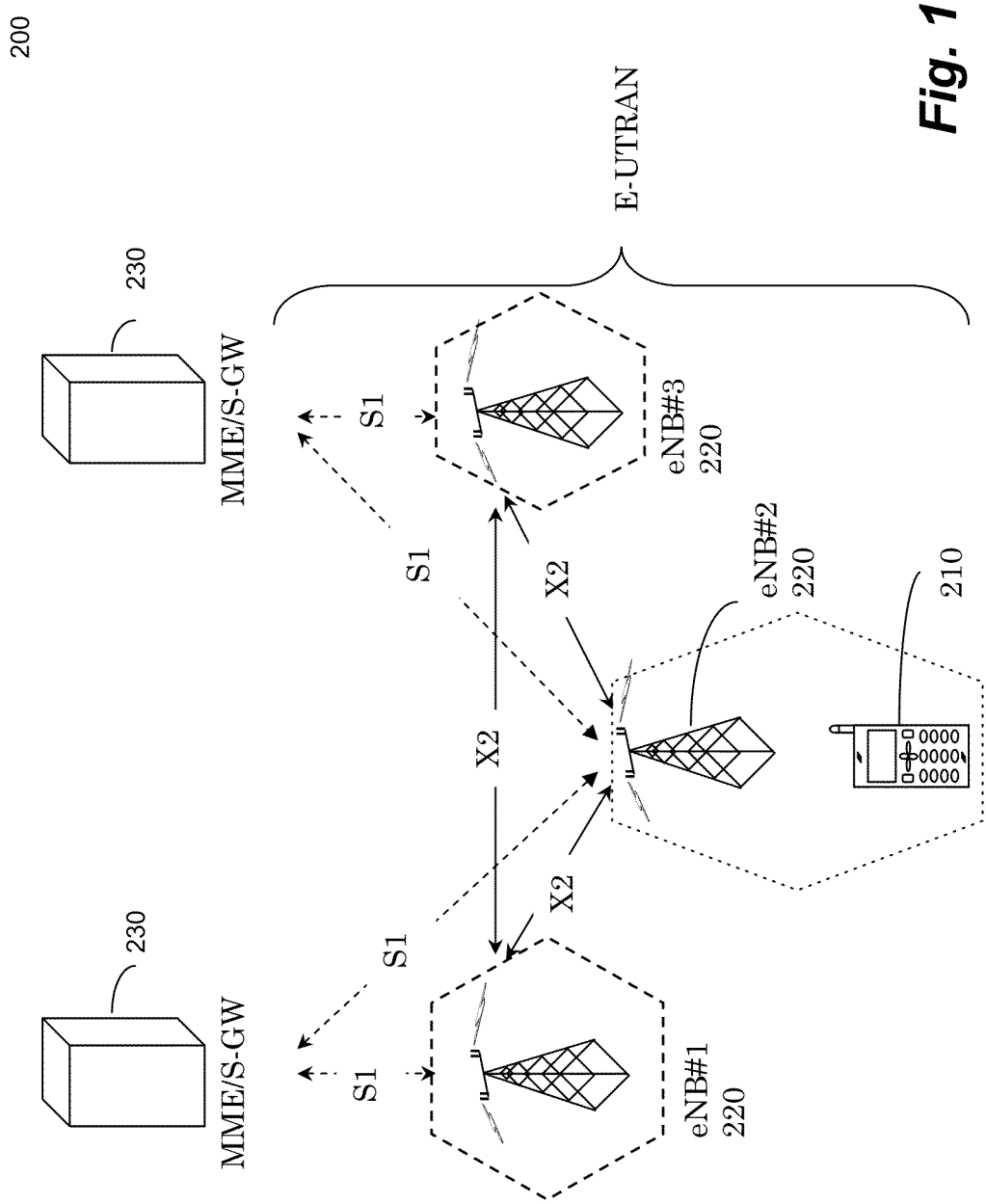
FIG. 1 shows a wireless communication system/access network of Long Term Evolution (LTE)

FIG. 1 shows a wireless communication system/access network of Long Term Evolution (LTE) 200, which includes an Evolved-Universal Terrestrial Radio Access Network (E-UTRAN). The E-UTRAN as shown includes a WTRU 210 and a base station, for example, such as several evolved Node Bs (eNBs) 220. As shown in FIG. 1, the WTRU 210 is in communication with an eNB 220. The eNBs 220 interface with each other using an X2 interface. The eNBs 220 are also connected to a Mobility Management Entity (MME)/Serving GateWay (S-GW) 230, through an 51 interface. Although a single WTRU 210 and three eNBs 220 are shown in FIG. 1, it should be apparent that any combination of wireless and wired devices may be included in the wireless communication system 200.

Figure 2:
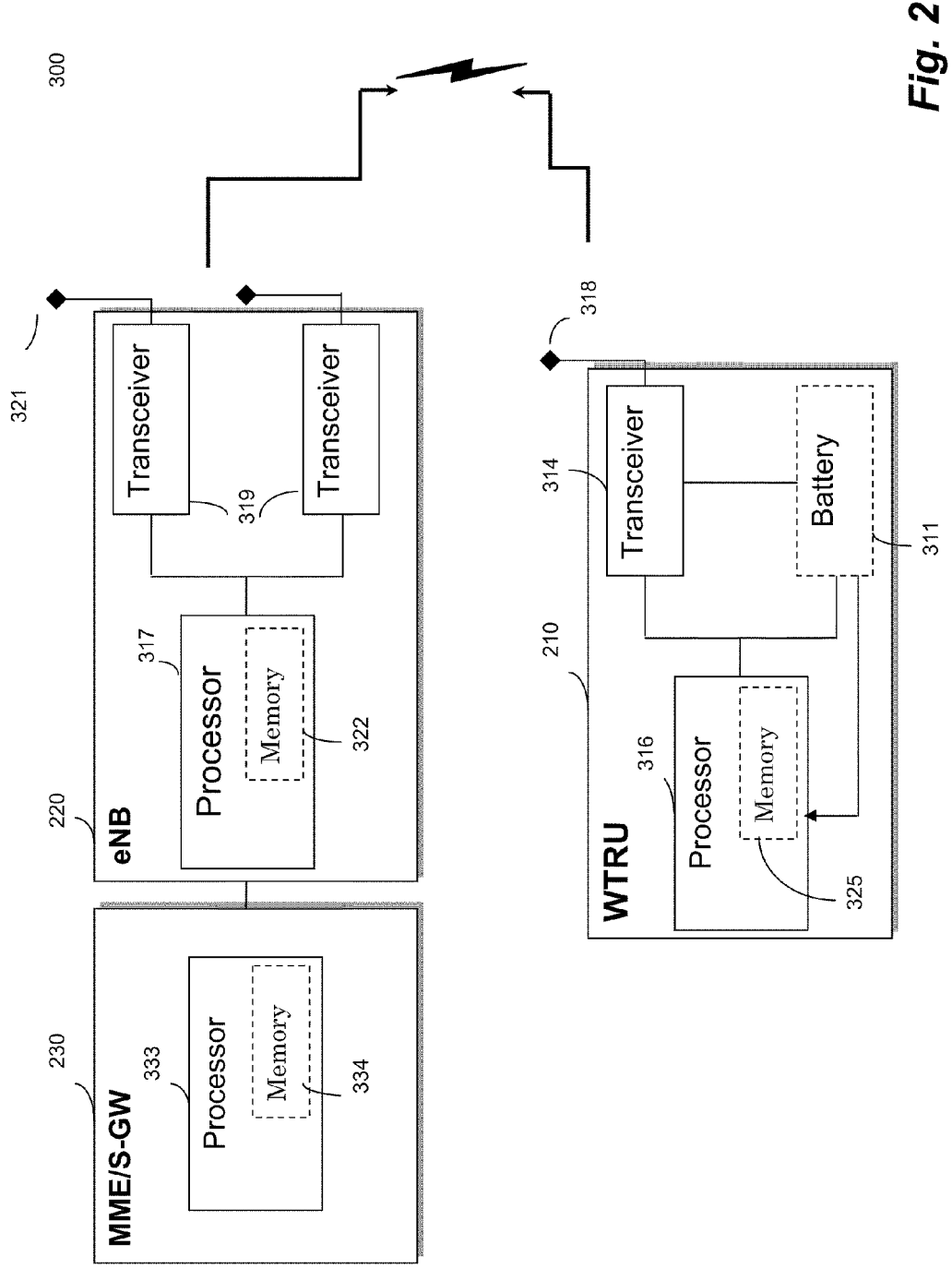
FIG. 2 are functional block diagrams of a wireless transmit/receive unit (WTRU), the base station and the Mobility Management Entity/Serving Gateway (MME/S-GW) of the wireless communication system of FIG. 2.

FIG. 2 is an example block diagram 300 of the WTRU 210, the eNB 220, and the MME/S-GW 230 of the wireless communication system 200 of FIG. 1. As shown in FIG. 2, the WTRU 210, the eNB 220 and the MME/S-GW 230 are configured to perform a method for signaling multi-user multiple-in multiple-out (MU-MIMO) parameters in MU-MIMO wireless communications.

In addition to the components that may be found in a typical WTRU, the WTRU 210 includes a processor 316 with an optional linked memory 325, a transmitter and receiver together designated as transceiver 314, an optional battery 311, and an antenna 318 (the antenna may be two or more units). The processor 316 is configured to perform a method for signaling MU-MIMO parameters in MU-MIMO wireless communications. The transceiver 314 is in communication with the processor 316 to facilitate the transmission and reception of wireless communications. In case a battery 311 is used in WTRU 210, it powers both the transceiver 314 and the processor 316.

In addition to the components that may be found in a typical eNB, the eNB 220 includes a processor 317 with an optional linked memory 322, transceivers 319, and antennas 321. The processor 317 is configured to perform a method for signaling MU-MIMO parameters in MU-MIMO wireless communications. The transceivers 319 are in communication with the processor 317 and antennas 321 to facilitate the transmission and reception of wireless communications. The eNB 220 is connected to the Mobility Management Entity/Serving-GateWay (MME/S-GW) 230 which includes a processor 333 with an optional linked memory 334.

Example signaling formats are described herein that allow use of distributed virtual resource blocks (DVRB) or for support of simultaneous communications of four wireless transmit/receive units (WTRUs) but maintaining a predetermined signal format size. A signaling format is also presented that signals transmission precoding matrix indexes used by all co-scheduled WTRUs. In particular, the signaling format methods described herein allow either use of DVRBs or support four WTRUs but maintain predetermined downlink control information (DCI) format size. Another signaling format method discloses a format that allows signaling the WTRU's transmission precoding matrix index (TPMI) as well as the number of other WTRUs sharing the resource blocks (RBs) and their TPMIs.

Table 1 below shows the number of bits for different fields for different signaling formats as well as the format for DCI format 1B. DCI format 1B and the previous signaling formats are provided and identified for comparison purposes. The fields which are common among the formats are not shown.

In cases where the bit size may be increased, an extra bit may be inserted and used as a power sharing bit. The PS bit allows the WTRU to correctly and dynamically interpret the ratio between its data power and the RB power. For the 4Tx case, where as many as four WTRUs can be co-scheduled, this method uses a different format without the DVRB flag bit but with two PS bits to signal that at least 1-4 WTRUs are sharing the same RBs.

This method is a compromise between using DVRBs and supporting four WTRUs. It eliminates the need to choose between DVRB and signaling power sharing options for the 2Tx case. Furthermore, the signaling format size is the same as DCI format 1B for the 2Tx and 4Tx cases. For the 4Tx case, it is noted that support for four WTRU support is more important than usage of DVRBs.

For LTE-advanced (LTE-A) communications, eight transmit antennas may be used at eNB and up to 8 MU-MIMO users may be scheduled on the same downlink RBs. Accordingly, this method may be generalized by using one extra bit to signal power sharing information. For LTE-A, the format may need to be increased in order to support high order MIMO (large codebook size) or more users (up to eight) for MU-MIMO.

Another example signaling format method permits the network to choose either usage of DVRBs or support of four WTRUs and is denoted as Method #2 in Table 1. In this method the DVRB flag is reintroduced and a single PS bit is used in the 2Tx case. In the 4Tx case, the network may configure the WTRU to receive either of two DCI formats to support a maximum of two or four users in the same RBs in MU-MIMO. One format has a DVRB flag and one bit for PS and supports a maximum of two users in the same RBs. The other format has no DVRB flag but has two PS bits that may be used to support a maximum of four users in the same RB. The total signaling format message size is the same as DCI format 1B.

TABLE 1

DCI Format 1D

| Alternatives for DCI format 1D Format | No. Tx | DVRB flag | Power share | PMI confirm | TPMI | total bits | notes |
|---|---|---|---|---|---|---|---|
| 1B | 2 | 1 | 0 | 1 | 2 | 4 | |
| 1B | 4 | 1 | 0 | 1 | 4 | 6 | |
| 1D First Option (Prior Art) | 2 | 1 | 1 | 0 | 2 | 4 | |
| 1D First Option (Prior Art) | 4 | 1 | 1 | 0 | 4 | 6 | |
| 1D Second Option (Prior Art) | 2 | 0 | 1 | 0 | 2 | 3 | |
| 1D Second Option (Prior Art) | 4 | 0 | 2 | 0 | 4 | 6 | |
| 1D Method # 1 | 2 | 1 | 1 | 0 | 2 | 4 | |
| 1D Method # 1 | 4 | 0 | 2 | 0 | 4 | 6 | |
| 1D Third Option (Prior Art) | 2 | 1 | 1 | 0 | 2 | 4 | |
| 1D Third Option (Prior Art) | 4 | 1 | 2 | 0 | 4 | 7 | |
| 1D Method # 2 | 2 | 1 | 1 | 0 | 2 | 4 | |
| 1D Method # 2 | 4 | 0/1 | 2/1 | 0 | 4 | 6 | Network configured |
| 1D Method # 3 a) | 2 | 1 | 1 | 0 | 2 | 4 | |
| 1D Method # 3 a) | 4 | 1 | 0 | 0 | 6 | 7 | |
| 1D Method # 3 b) | 2 | 0 | 1 | 0 | 2 | 3 | |
| 1D Method # 3 b) | 4 | 0 | 0 | 0 | 6 | 6 | |

An example signaling format method supporting DVRBs for a two transmitting (2Tx) case and support four WTRUs for the four transmitting (4Tx) case is now discussed and is denoted as Method #1 in Table 1. In this method, the DVRB flag is used for the 2Tx case along with a one bit power sharing (PS) bit to signal whether another WTRU is sharing resource blocks (RBs). As shown in Table 1, the power sharing bit is in the forth column. In cases where the bit size is maintained, another bit(s) is reused as the power sharing bit.

This method assumes that the question of which is more important, (i.e., supporting a maximum of four WTRUs without DVRBs or a maximum of 2 WTRUs with DVRB for the 4Tx case), is either not answered or may be deployment dependent. The choice may be made by the network. In this method, the message size constraint is considered to be more important than supporting both simultaneously. The network configuration for indicating either of two DCI formats can be indicated by higher layer signaling (e.g., Radio Resource Control (RRC) signaling). The signaling overhead does not increase when using RRC signaling for the current system due to an unused state for transmission mode signaling. There are currently 7 transmission modes. One state is unused for 3 bit signaling, thus the unused state may be used to indicate one more formats. Additionally, it may be indicated by broadcasting via a common control channel (e.g., broadcast channel).

For LTE-advanced (LTE-A) communications, eight transmit antennas may be used at eNB and up to 8 MU-MIMO users may be scheduled on the same downlink RBs. Accordingly, this method may be generalized by using one extra bit to signal power sharing information. For LTE-A, the format may need to be increased in order to support high order MIMO (large codebook size) or more users (up to eight) for MU-MIMO.

An example signaling format method may also be used to signal transmission precoding matrix indexes (TPMIs) of all co-scheduled WTRUs. Currently there is no provision for allowing the signaling of the TPMIs used by all other co-scheduled WTRUs. Such signaling would allow improved detection leading to better performance. The example signaling format is identified as Method 3a in Table 1 and provides this additional information with no increased signaling overhead. Note that this is being compared with the current format where 4 and 7 bits are used for 2 and 4 Tx antennas. As such, the example formats have the same number of bits with no increase in overhead.

In order to reduce signaling overhead without sacrificing performance, only unitary precoding is used. In the 2Tx case, there are four precoding matrix index (PMI) options which consist of two groups of two unitary precoding matrices. Therefore, once the WTRU knows its TPMI and whether another WTRU is co-scheduled, it knows which TPMI is used by the other WTRU. The example signaling format uses an optional DVRB flag bit, a single PS bit and two bits to signal which of the four PMI vectors is assigned to it. The resultant signaling format size for the 2Tx case is equal to DCI format 1B.

For the 4Tx case, only the first eight entries in the 4Tx precoding matrix of size 16 are used. The first four correspond to one unitary precoding group while the second four correspond to a second unitary precoding group. Co-scheduled WTRUs are assigned TPMIs from either group but not among both groups in order to maintain unitary precoding.

The signaling format method for the 4Tx case provides an optional DVRB flag bit and six bits to signal the TPMIs that are used by all co-scheduled WTRUs. The first three TPMI bits indicate the TPMI used by the WTRU while the second three TPMI bits indicate which TPMIs are used by the other co-scheduled WTRUs. The PS information can be obtained automatically when TPMIs for other co-scheduled WTRUs are known to the WTRU. This eliminates the need for two explicit PS bits.

When the DVRB flag bit is not used, the result is depicted in Table 1 as Method 3b. In this case, the signaling format message size for DCI format 1D is the same as DCI format 1B.

For LTE-advanced (LTE-A) communications, eight transmit antennas may be used at eNB and up to 8 MU-MIMO users may be scheduled on the same downlink RBs. Accordingly, this method may be generalized by using one or more extra bits (depending on the precoding codebook size) to signal TPMIs of co-scheduled WTRUs. For LTE-A, the format may need to be increased in order to support high order MIMO (large codebook size) or more users (up to eight) for MU-MIMO.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a software defined radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module or a Near Field Communication (NFC) Module.

What is claimed is:

1. A method for signaling multi-user multiple-input multiple-output (MU-MIMO) transmission parameters, the method comprising:

receiving a downlink control information message with a distributed virtual resource block (DVRB) flag, a power share bit, and two transmission precoding matrix index (TPMI) bits conveying the transmission parameters on a condition of a two transmitting antenna configuration, wherein the two TPMI bits indicate TPMIs of wireless transmit receive units (WTRUs) co-scheduled using the two transmitting antenna configuration;

receiving a downlink control information message with a DVRB flag and six TPMI bits conveying the transmission parameters on a condition of a four transmitting antenna configuration, wherein the six TPMI bits indicate TPMIs of WTRUs co-scheduled using the four transmitting antenna configuration, and wherein power sharing for the four transmitting antenna configuration is obtained from the six TPMI bits; and processing the downlink control information messages and the transmission parameters associated therewith to provide MU-MIMO reception for the two transmitting antenna configuration and the four transmitting antenna configuration.

2. The method as in claim 1, wherein the downlink control information for the two transmitting antenna configuration and the downlink control information for the four transmitting antenna configuration match a predetermined downlink control information format size.

3. The method as in claim 2, wherein the power share bit or the six TPMI bits from which power sharing is obtained allows a wireless transmit/receive unit to correctly and dynamically interpret the ratio between its data power and a resource block power.

4. The method as in claim 1, wherein the power share bit or the six TPMI bits from which power sharing is obtained signal whether at least two wireless transmit/receive units are sharing resource blocks.

5. The method as in claim 1, further comprising:
receiving a downlink control information message with more than six TPMI bits conveying the transmission parameters on a condition of an eight transmitting antenna configuration.

6. A method for signaling multi-user multiple-input multiple-output (MU-MIMO) transmission parameters, the method comprising:
receiving a downlink control information message with two transmission precoding matrix index (TPMI) bits and a power share bit conveying the transmission parameters on a condition of a two transmitting antenna configuration, wherein the two TPMI bits indicate TPMIs of wireless transmit receive units (WTRUs) co-scheduled using the two transmitting antenna configuration;
receiving a downlink control information message with six transmission precoding matrix index bits conveying the transmission parameters on a condition of a four transmitting antenna configuration, wherein the six TPMI bits indicate TPMIs of WTRUs co-scheduled using the four transmitting antenna configuration, and wherein power sharing for the four transmitting antenna configuration is obtained from the six TPMI bits; and
processing the downlink control information messages and the transmission parameters associated therewith to provide MU-MIMO reception for the two transmitting antenna configuration and the four transmitting antenna configuration.

7. The method as in claim 6, further comprising receiving a downlink control information message with a distributed virtual resource block flag for the two transmitting antenna configuration.

8. The method as in claim 6, further comprising receiving a downlink control information message with a distributed virtual resource block flag for the four transmitting antenna configuration.

9. The method as in claim 6, wherein the power share bit signals whether at least two wireless transmit/receive units are sharing resource blocks.

10. The method as in claim 6, further comprising:
receiving a downlink control information message with additional power share bits or additional TPMI bits conveying the transmission parameters on a condition of an eight transmitting antenna configuration.

11. The method as in claim 6, wherein unitary precoding is used.

12. A wireless transmit/receive unit (WTRU) for receiving multi-user multiple-input multiple-output (MU-MIMO) transmission parameters, comprising:
a receiver configured to receive a downlink control information message with a distributed virtual resource block (DVRB) flag, a power share bit, and two transmission precoding matrix index (TPMI) bits conveying the transmission parameters on a condition of a two transmitting antenna configuration and to receive a downlink control information message with a DVRB flag and six TPMI bits conveying the transmission parameters on a condition of a four transmitting antenna configuration, wherein the two TPMI bits indicate TPMIs of wireless transmit receive units (WTRUs) co-scheduled using the two transmitting antenna configuration, wherein the six TPMI bits indicate TPMIs of wireless (WTRUs) co-scheduled using the four transmitting antenna configuration, and wherein power sharing for the four transmitting antenna configuration is obtained from the six TPMI bits; and
a processor configured to process the downlink control information messages and the transmission parameters associated therewith to provide MU-MIMO reception for the two transmitting antenna configuration and the four transmitting antenna configuration.

13. The WTRU as in claim 12, wherein the downlink control information for the two transmitting antenna configuration and the downlink control information for the four transmitting antenna configuration match a predetermined downlink control information format size.

14. The WTRU as in claim 12, wherein the power share bit or six TPMI bits from which power sharing is obtained signal whether at least two wireless transmit/receive units are sharing resource blocks.

15. The WTRU as in claim 12, wherein the power share bit or the six TPMI bits from which power sharing is obtained allows a wireless transmit/receive unit to correctly and dynamically interpret the ratio between its data power and a resource block power.

16. The WTRU as in claim 12, wherein the receiver is further configured to receive a downlink control information message with more than six TPMI bits conveying the transmission parameters on a condition of an eight transmitting antenna configuration.

* * * * *